(12) United States Patent
Singhal et al.

(10) Patent No.: US 9,031,898 B2
(45) Date of Patent: May 12, 2015

(54) PRESENTATION OF SEARCH RESULTS BASED ON DOCUMENT STRUCTURE

(75) Inventors: Amitabh K. Singhal, Palo Alto, CA (US); Viresh Ratnakar, Sunnyvale, CA (US); Maxim Lifantsev, Mountain View, CA (US); Joseph Kieran O'Sullivan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1920 days.

(21) Appl. No.: 10/949,708

(22) Filed: Sep. 27, 2004

(65) Prior Publication Data

US 2006/0074907 A1    Apr. 6, 2006

(51) Int. Cl.
*G06F 17/30*     (2006.01)
*G06F 17/21*     (2006.01)
*G06F 17/22*     (2006.01)

(52) U.S. Cl.
CPC .......... *G06F 17/3061* (2013.01); *G06F 17/211* (2013.01); *G06F 17/2247* (2013.01); *G06F 17/30864* (2013.01); *G06F 17/30908* (2013.01)

(58) Field of Classification Search
USPC ........................................................ 715/205
See application file for complete search history.

(56) References Cited

U.S. PATENT DOCUMENTS

| | | | |
|---|---|---|---|
| 5,619,709 A * | 4/1997 | Caid et al. ..................... | 715/532 |
| 5,694,594 A * | 12/1997 | Chang ................................... | 1/1 |
| 5,943,669 A | 8/1999 | Numata | |
| 6,105,044 A * | 8/2000 | DeRose et al. ................ | 715/514 |
| 6,167,397 A * | 12/2000 | Jacobson et al. ..................... | 1/1 |
| 6,212,494 B1 * | 4/2001 | Boguraev .......................... | 704/9 |
| 6,363,378 B1 * | 3/2002 | Conklin et al. ....................... | 1/1 |
| 6,523,026 B1 * | 2/2003 | Gillis ................................... | 1/1 |
| 6,678,692 B1 * | 1/2004 | Hyatt ............................ | 707/758 |
| 7,107,536 B1 * | 9/2006 | Dowling ....................... | 715/738 |
| 7,165,216 B2 * | 1/2007 | Chidlovskii et al. .......... | 715/237 |
| 7,171,404 B2 * | 1/2007 | Lindblad et al. ...................... | 1/1 |
| 7,320,000 B2 * | 1/2008 | Chitrapura et al. .................... | 1/1 |
| 7,508,935 B2 * | 3/2009 | Oommen et al. .............. | 380/28 |
| 7,512,615 B2 * | 3/2009 | Bordawekar et al. ................. | 1/1 |
| 7,593,932 B2 * | 9/2009 | Lindh et al. ........................... | 1/1 |
| 8,244,795 B2 * | 8/2012 | Ponte ............................ | 709/203 |
| 2001/0037324 A1 * | 11/2001 | Agrawal et al. ................... | 707/1 |
| 2002/0116622 A1 * | 8/2002 | Okaue et al. .................. | 713/189 |
| 2003/0050927 A1 * | 3/2003 | Hussam ........................... | 707/5 |
| 2003/0115191 A1 * | 6/2003 | Copperman et al. ............. | 707/3 |
| 2003/0217335 A1 * | 11/2003 | Chung et al. .................. | 715/514 |

(Continued)

FOREIGN PATENT DOCUMENTS

| | | |
|---|---|---|
| JP | 2003-030241 | 1/2003 |
| JP | 2004-157628 | 6/2004 |
| WO | WO 03/098466 A1 | 11/2003 |

OTHER PUBLICATIONS

Schlieder et al., Result Ranking for Structured Queries against XML Documents, 2000, pp. 1-6.*

(Continued)

*Primary Examiner* — Leslie Wong
(74) *Attorney, Agent, or Firm* — Harrity & Harrity, LLP

(57) ABSTRACT

A system identifies a document relating to a search term, where the document includes a set of structural elements. The system determines a distribution of occurrences of the search term in the document, identifies one of the structural elements based on the distribution of occurrences of the search term in the document, and presents information associated with the identified structural element.

46 Claims, 15 Drawing Sheets

(56) References Cited

U.S. PATENT DOCUMENTS

| | | | |
|---|---|---|---|
| 2004/0068697 A1* | 4/2004 | Harik et al. .................. | 715/513 |
| 2004/0083211 A1 | 4/2004 | Bradford ........................... | 707/3 |
| 2004/0103091 A1* | 5/2004 | Lindblad et al. ................. | 707/3 |
| 2004/0133560 A1* | 7/2004 | Simske ............................. | 707/3 |
| 2005/0149473 A1* | 7/2005 | Weare .............................. | 707/1 |
| 2005/0149494 A1* | 7/2005 | Lindh et al. ..................... | 707/3 |
| 2005/0177555 A1* | 8/2005 | Alpert et al. ..................... | 707/3 |
| 2006/0031219 A1* | 2/2006 | Chernyak et al. ................ | 707/5 |
| 2007/0168327 A1* | 7/2007 | Lindblad et al. ................. | 707/2 |
| 2007/0226640 A1* | 9/2007 | Holbrook et al. ............ | 715/765 |

OTHER PUBLICATIONS

Lin Guo et al.;-"XRANK: Ranked Keyword Search over XML Documents"; Proceedings of SIGMOD 2003; Jun. 9, 2003; 12 pages.

Jens E. Wolff et al.; "Searching and Browsing Collections of Structural Information"; Proceedings, IEEE; May 22-24, 2000; 10 pages.

International Search Report for corresponding PCT application with a mailing date of Dec. 23, 2005; 4 pages.

Japanese Office Action corresponding to JP 2007-533473, mailed Dec. 15, 2009, 5 pages.

Hiroko Kinutani et al., "A Survey of Keyword-based XML Document Retrieval", vol. 45, No. SIG 7(TOD22), Jun. 15, 2004, pp. 255-273.

Masahiro Watanabe et al., "Integration of Two Search Models by XPath: Keyword Match and Vector Match", vol. 2000, No. 69, 2000—DBS—122, Jul. 28, 2000, pp. 369-376.

Hiroko Kinutani et al., "A Retrieval Method for Partial XML Documents Using their Structures and Contents", vol. 43, No. SIG 2 (TOD 13) Mar. 15, 2002, pp. 80-93. (English Abstract).

* cited by examiner

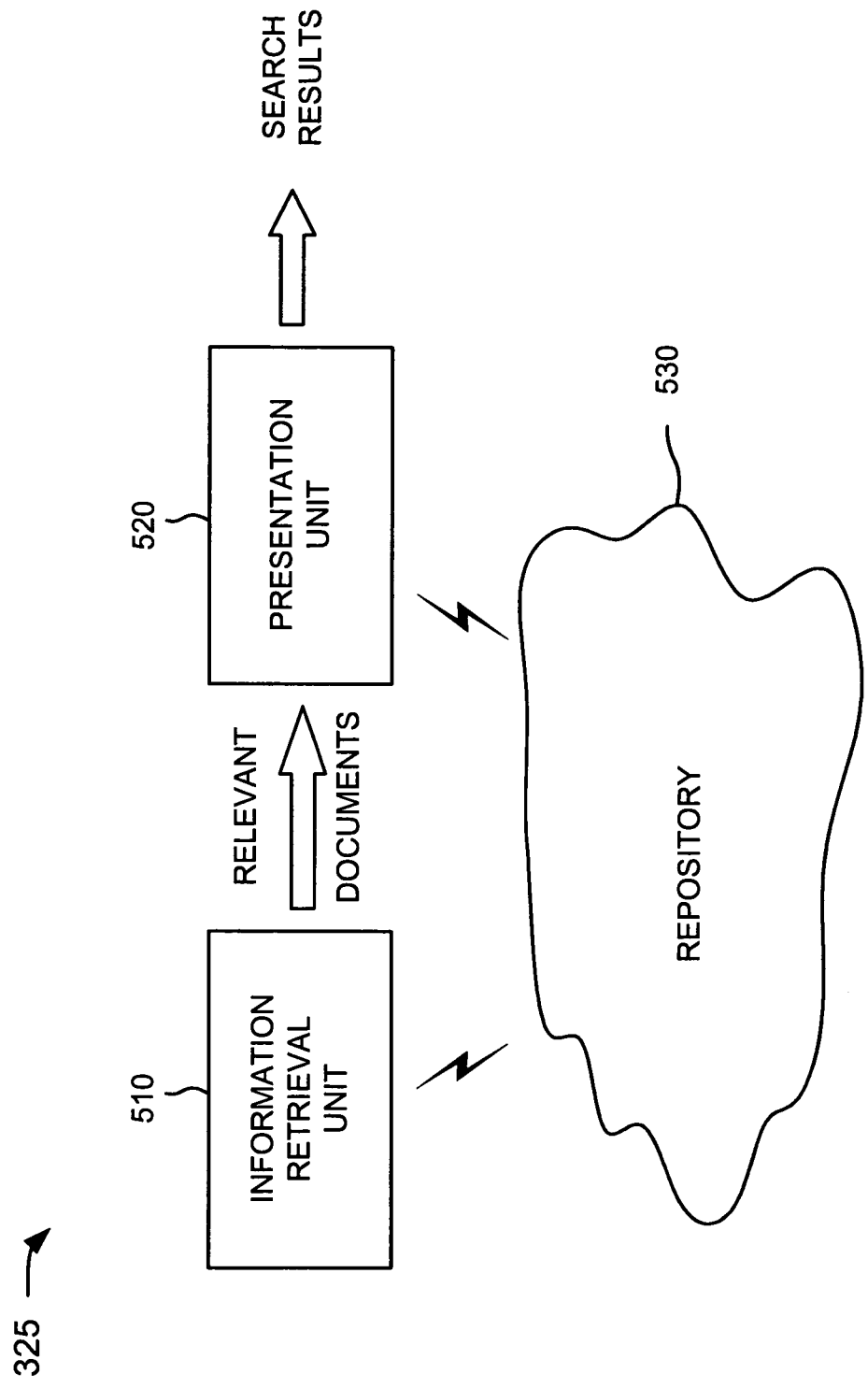

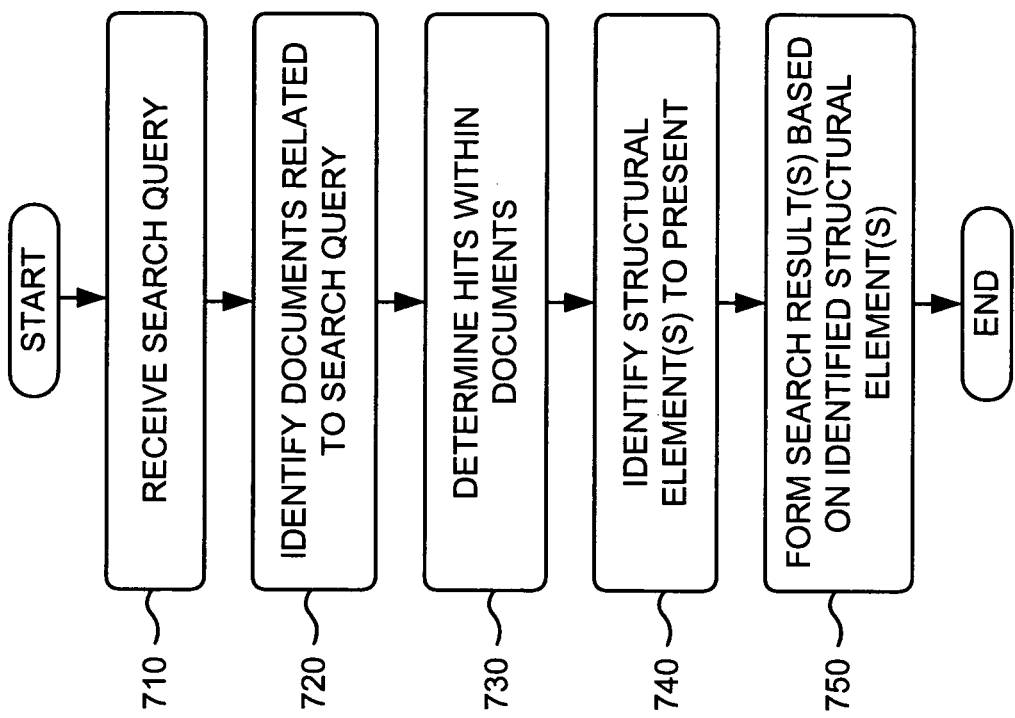

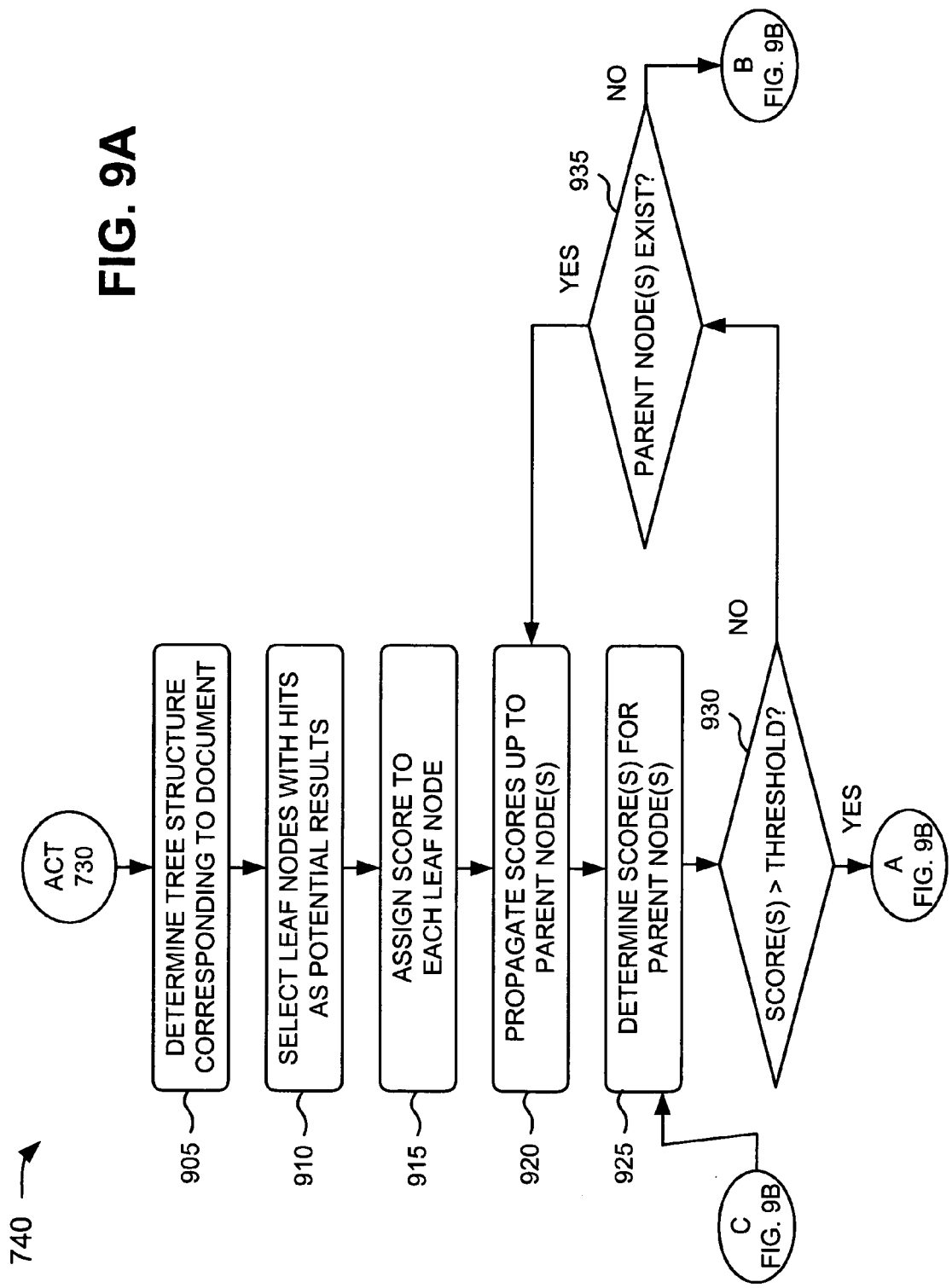

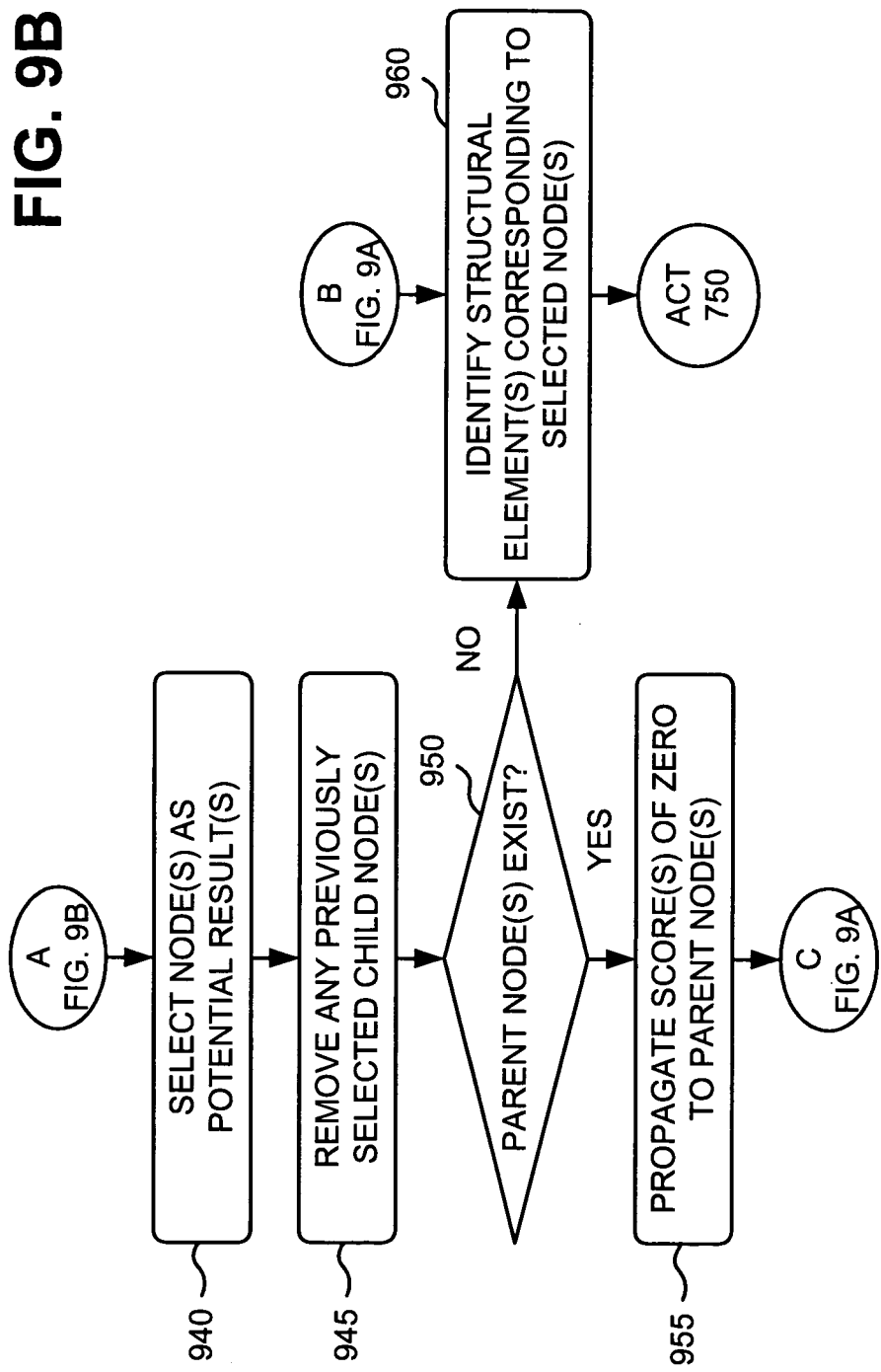

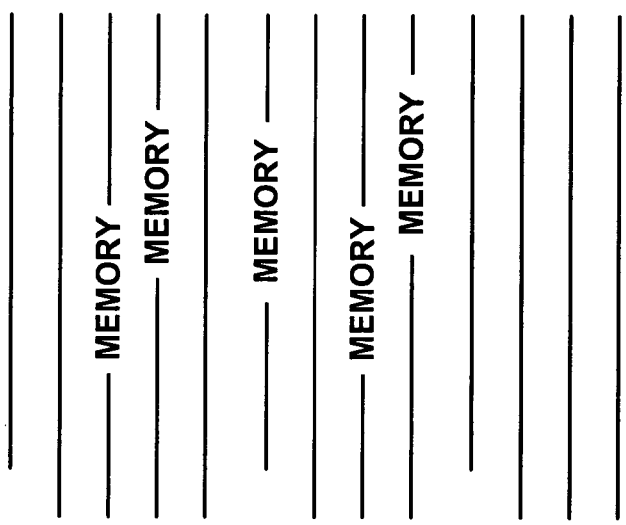

PRESENTATION OF SEARCH RESULTS BASED ON DOCUMENT STRUCTURE

BACKGROUND

1. Field of the Invention

Systems and methods consistent with the principles of the invention relate generally to information retrieval and, more particularly, to the presentation of documents as search results based on the structure of the documents.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web documents in which a user is interested. Generally, search engines base their determination of the user's interest on search terms (called a search query) entered by the user. The goal of the search engine is to provide high quality, relevant results to the user based on the search query. Typically, the search engine accomplishes this by matching the terms in the search query to a corpus of pre-stored web documents. Web documents that contain the user's search terms are "hits" and are returned to the user. Existing search engines typically present hits as excerpts from the web documents. The excerpts may be displayed in a single web page, as a search results page.

SUMMARY

According to one aspect, a method may include identifying a document relating to a search term, where the document includes a set of structural elements. The method may also include determining a distribution of occurrences of the search term in the document, identifying one of the structural elements based on the distribution of occurrences of the search term in the document, and presenting information associated with the identified structural element.

According to another aspect, a method may include identifying a document that is relevant to a search term, where the document includes a set of structural elements. The method may also include determining occurrences of the search term in the document, grouping the occurrences of the search term into clusters based on physical proximity of the occurrences of the search term, determining one of the structural elements encompassing each of the clusters, and providing information related to the determined structural elements.

According to yet another aspect, a method may include identifying a document that is relevant to a search term, where the document includes a set of structural elements, and where the structural elements include the document, a set of parts of the document, and a set of pages of the document. The method may also include identifying a tree representation of the document, where the pages of the document correspond to leaf nodes, the parts of the document correspond to higher level nodes, and the document corresponds to a root node. The method may also include assigning scores to the leaf nodes based on whether the leaf nodes contain occurrences of the search term, determining scores for the higher level nodes based on the scores of associated ones of the leaf nodes, determining a score for the root node based on the scores of the higher level nodes, selecting one of the leaf nodes, one of the higher level nodes, or the root node, as a selected node, based on the scores, and providing information relating to the selected node.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is an exemplary functional block diagram of the search engine of FIG. 4 according to an implementation consistent with the principles of the invention;

FIGS. 7-9B are flowcharts of exemplary processing for presenting search results according to an implementation consistent with the principles of the invention; and FIGS. 10A-10D illustrate exemplary search results for an exemplary book.

DETAILED DESCRIPTION

The following detailed description of the invention refers to the accompanying drawings. The same reference numbers in different drawings may identify the same or similar elements. Also, the following detailed description does not limit the invention.

Overview

More and more types of documents are becoming searchable via search engines. Some types of documents are structured in the sense that they include a set of structural elements, such as parts, chapters, sections, pages, etc. Examples of these types of documents may include books, web sites, magazines, newspapers, articles, patents, and catalogs. These documents may be scanned and have their text recognized via optical character recognition (OCR).

Figure 1:
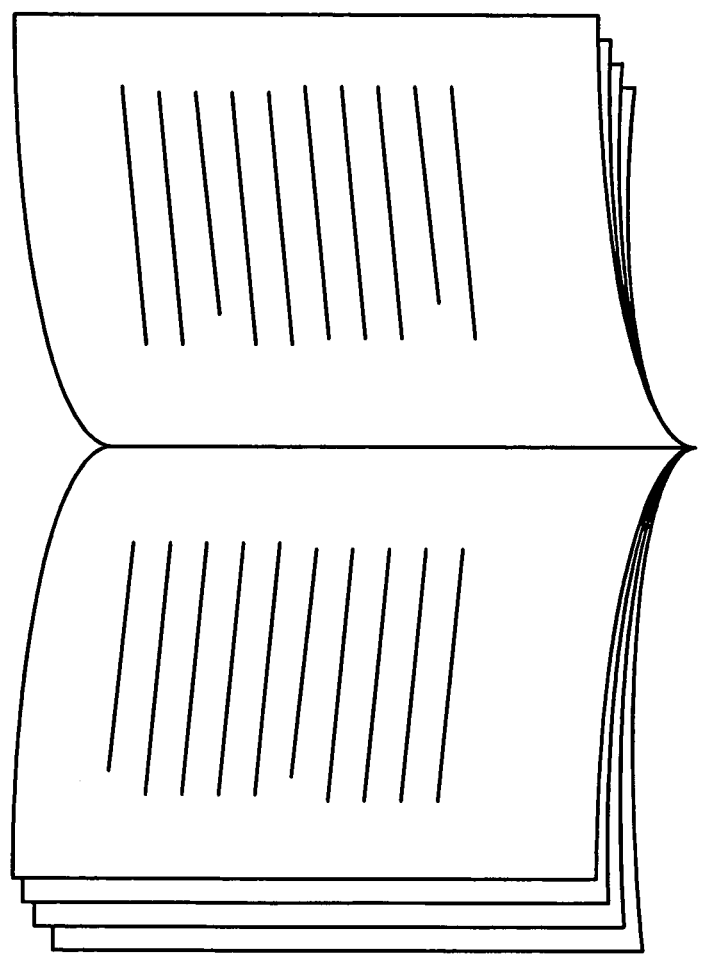
FIG. 1 is an exemplary diagram of a document.

FIG. 1 is an exemplary diagram of a structured document. In this exemplary implementation, the document takes for the form of a book. The book may be scanned or otherwise obtained in electronic form. A typical book may include a number of structural elements. The particular structural elements of a book may be determined by OCR, provided by a publisher, or obtained in other ways.

Figure 2:
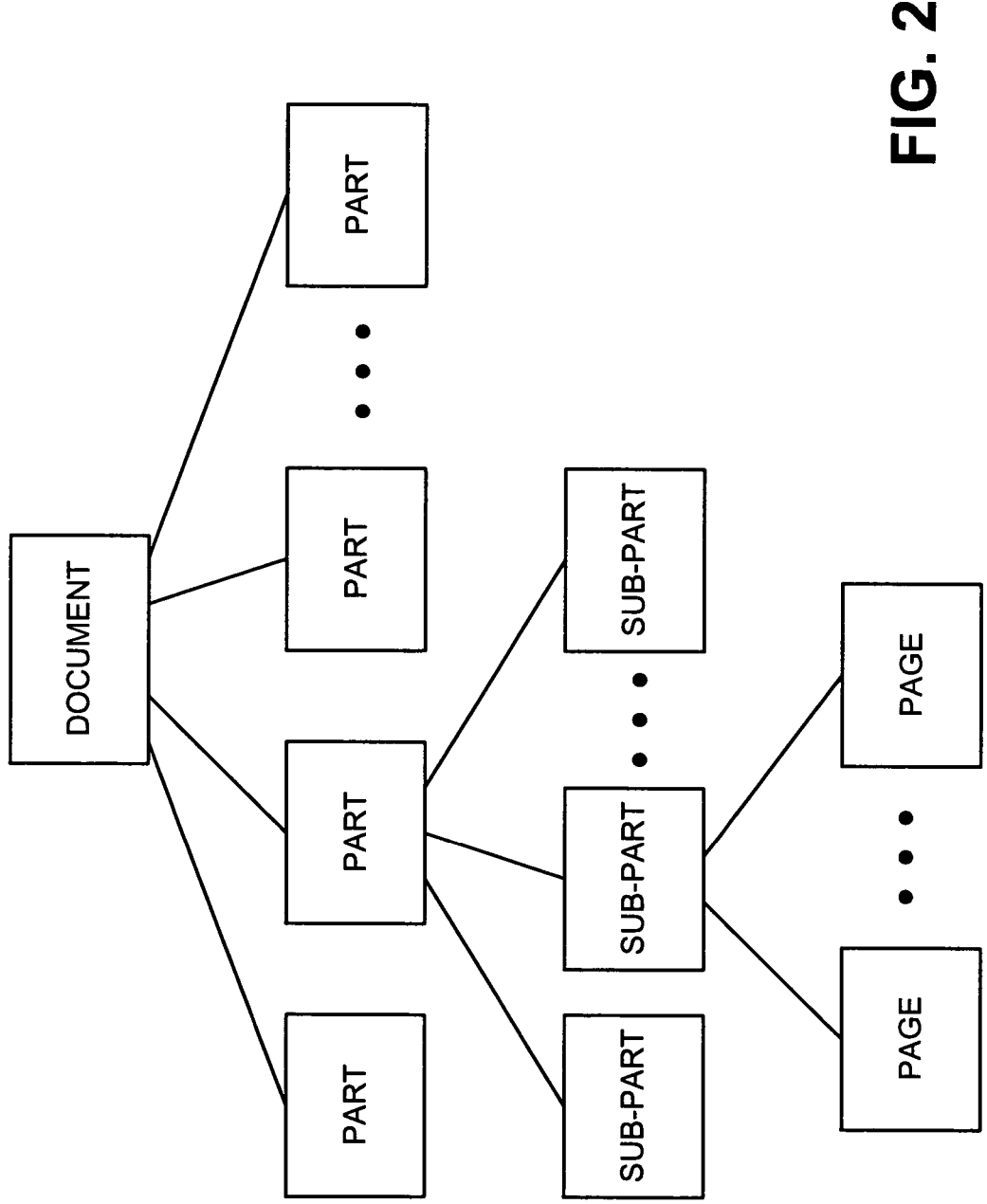
FIG. 2 is a diagram of exemplary structural elements of a document.

FIG. 2 is a diagram of exemplary structural elements of a document. As shown in FIG. 2, the structural elements may be arranged in a hierarchical fashion. The structural elements in FIG. 2 may be arranged into four levels. In other implementations, the structural elements may be arranged into any number of levels—more or fewer than four.

As shown in FIG. 2, the structural element at the highest level may include the document itself. The structural elements at the next highest level may include parts of the document. In the case of a book, the parts may correspond to chapters of the book. In the case of a web site, the parts may correspond to portions of the web site. In the case of an article, the parts may correspond to sections of the article.

The structural elements at the next highest level may include sub-parts of the document. In the case of a book, the sub-parts may correspond to sub-chapters or sections of the book. In the case of a web site, the sub-parts may correspond to sub-portions of the web site. In the case of an article, the sub-parts may correspond to sub-sections of the article. The structural elements at the next highest level in the hierarchical structure may include pages of the document.

Systems and methods consistent with the principles of the invention may present search results based on the structural elements associated with the underlying documents and the distribution of hits within the documents.

Exemplary Information Retrieval Network

Figure 3:
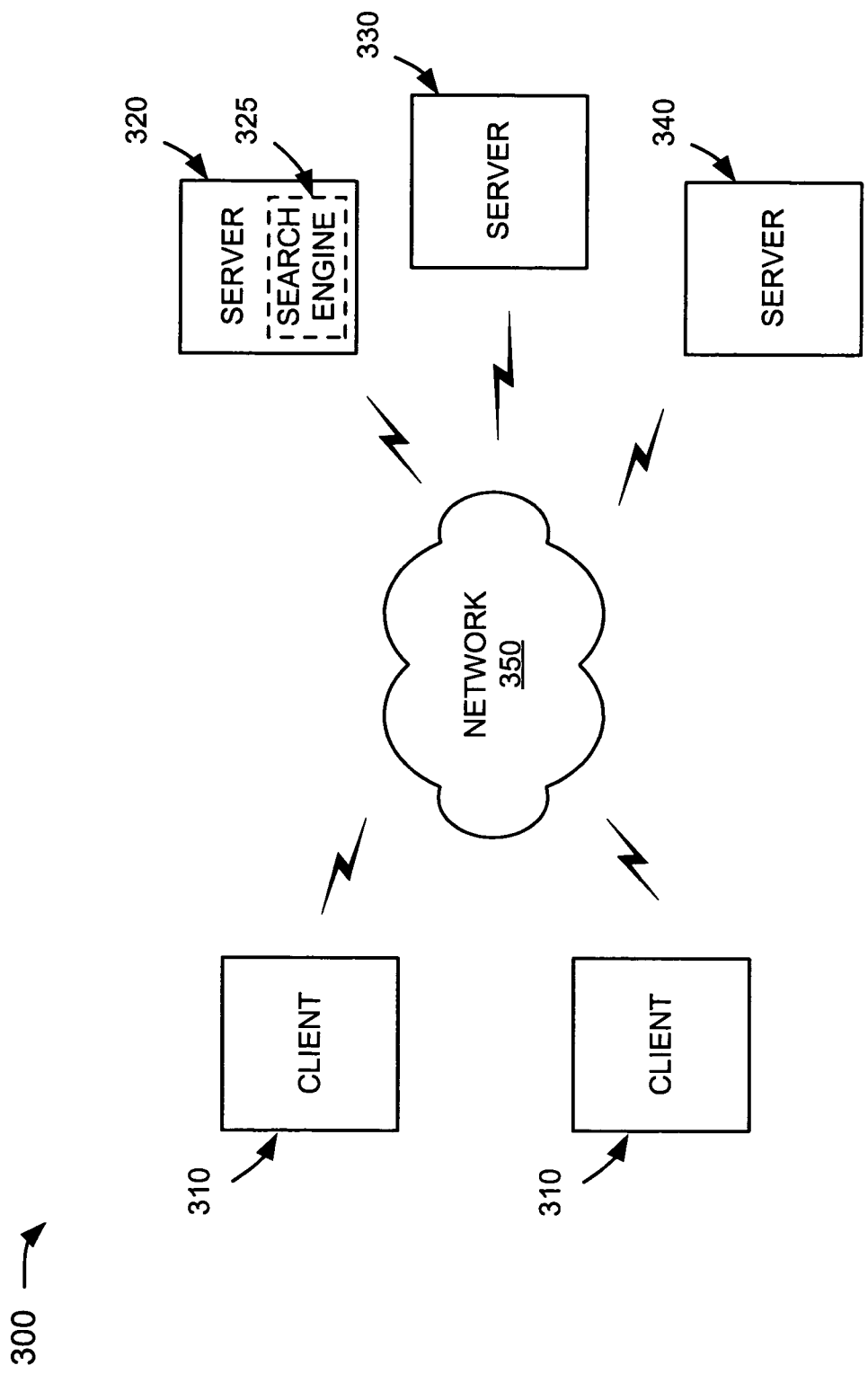
FIG. 3 is a diagram of an exemplary information retrieval network in which systems and methods consistent with the principles of the invention may be implemented.

FIG. 3 is an exemplary diagram of a network 300 in which systems and methods consistent with the principles of the invention may be implemented. Network 300 may include multiple clients 310 connected to multiple servers 320-340 via a network 350. Network 350 may include a local area network (LAN), a wide area network (WAN), a telephone network, such as the Public Switched Telephone Network (PSTN), an intranet, the Internet, a memory device, or a combination of networks. Two clients 310 and three servers 320-340 have been illustrated as connected to network 350 for simplicity. In practice, there may be more or fewer clients and servers. Also, in some instances, a client may perform the functions of a server and/or a server may perform the functions of a client.

Clients 310 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 320-340 may include server entities that gather, process, search, and/or maintain documents in a manner consistent with the principles of the invention. Clients 310 and servers 320-340 may connect to network 350 via wired, wireless, and/or optical connections.

In an implementation consistent with the principles of the invention, server 320 may include a search engine 325 usable by clients 310. Server 320 may identify a corpus of documents (e.g., via scanning or crawling), index the documents, and store information associated with the documents in a repository of documents. Servers 330 and 340 may store or maintain documents, such as web pages or web sites. While servers 320-340 are shown as separate entities, it may be possible for one or more of servers 320-340 to perform one or more of the functions of another one or more of servers 320-340. For example, it may be possible that two or more of servers 320-340 are implemented as a single server. It may also be possible for a single one of servers 320-340 to be implemented as two or more separate (and possibly distributed) devices.

Exemplary Client/Server Architecture

Figure 4:
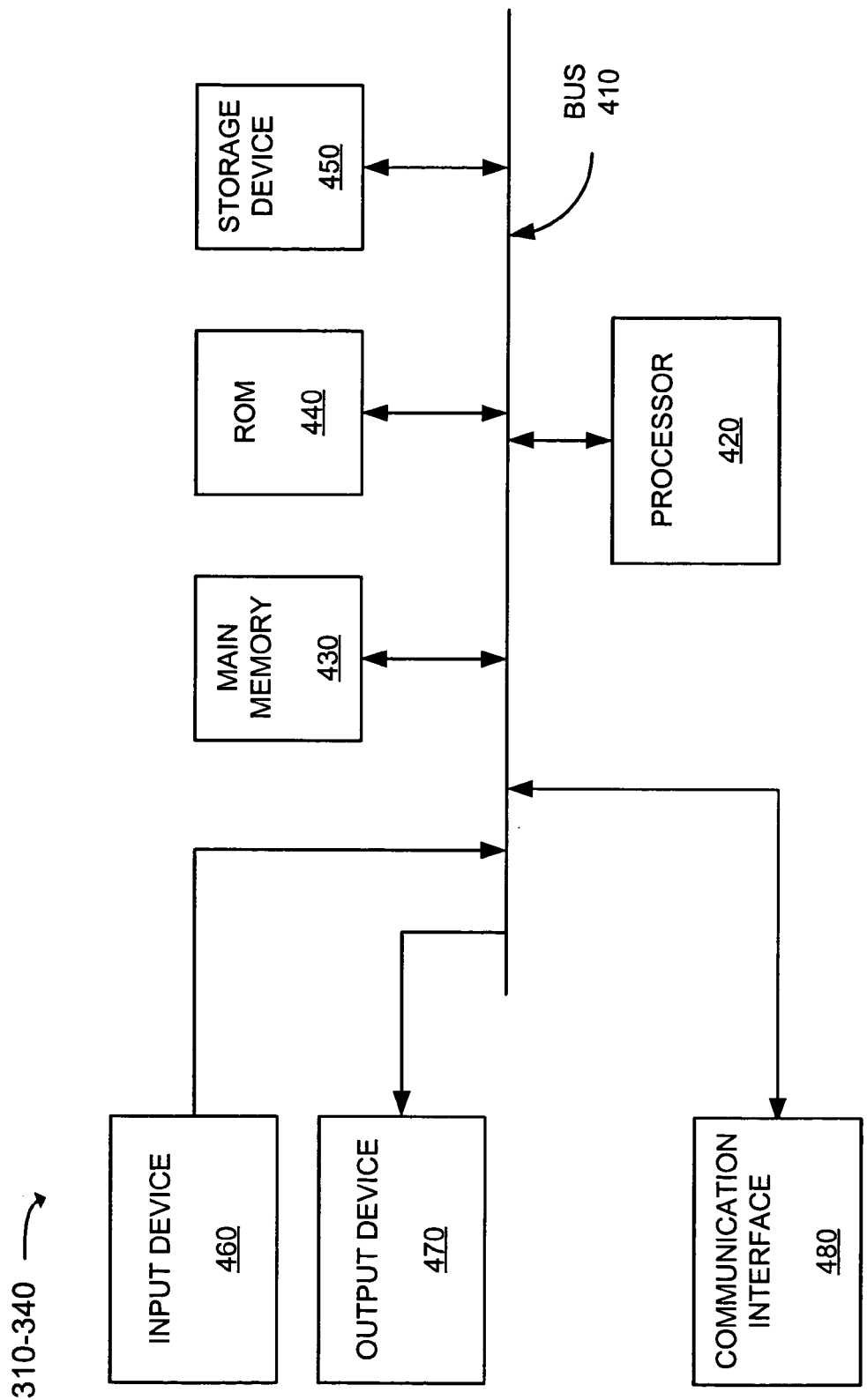
FIG. 4 is an exemplary diagram of a client or server according to an implementation consistent with the principles of the invention.

FIG. 4 is an exemplary diagram of a client or server entity (hereinafter called "client/server entity"), which may correspond to one or more of clients 310 and servers 320-340, according to an implementation consistent with the principles of the invention. The client/server entity may include a bus 410, a processor 420, a main memory 430, a read only memory (ROM) 440, a storage device 450, an input device 460, an output device 470, and a communication interface 480. Bus 410 may include a path that permits communication among the elements of the client/server entity.

Processor 420 may include a conventional processor, microprocessor, or processing logic that interprets and executes instructions. Main memory 430 may include a random access memory (RAM) or another type of dynamic storage device that stores information and instructions for execution by processor 420. ROM 440 may include a conventional ROM device or another type of static storage device that stores static information and instructions for use by processor 420. Storage device 450 may include a magnetic and/or optical recording medium and its corresponding drive.

Input device 460 may include a conventional mechanism that permits an operator to input information to the client/server entity, such as a keyboard, a mouse, a pen, voice recognition and/or biometric mechanisms, etc. Output device 470 may include a conventional mechanism that outputs information to the operator, including a display, a printer, a speaker, etc. Communication interface 480 may include any transceiver-like mechanism that enables the client/server entity to communicate with other devices and/or systems. For example, communication interface 480 may include mechanisms for communicating with another device or system via a network, such as network 350.

As will be described in detail below, the client/server entity, consistent with the principles of the invention, may perform certain searching-related operations. The client/server entity may perform these operations in response to processor 420 executing software instructions contained in a computer-readable medium, such as memory 430. A computer-readable medium may be defined as a physical or logical memory device and/or carrier wave.

The software instructions may be read into memory 430 from another computer-readable medium, such as data storage device 450, or from another device via communication interface 480. The software instructions contained in memory 430 may cause processor 420 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Search Engine

FIG. 5 is an exemplary functional block diagram of a search engine, such as search engine 325, according to an implementation consistent with the principles of the invention. According to one implementation, one or more of the functions described below may be performed by another portion of server 320 or an entity separate from server 320, such as a computer associated with server 320 or one of servers 330 or 340.

Search engine 325 may include information retrieval unit 510 and presentation unit 520 connected to a repository 530. Repository 530 may include a physical or logical memory device that stores information associated with documents that were crawled and indexed by, for example, server 320 (FIG. 3) or an entity separate from server 320. The document information may include the document content and associated metadata. In an implementation consistent with the principles of the invention, the metadata associated with a document may include information regarding the structural elements associated with the document. The particular structural elements associated with a document may be determined by OCR, provided by a publisher, or obtained in other ways.

Information retrieval unit 510 may operate upon user search terms to identify documents that are relevant to the terms. There are a number of techniques that information retrieval unit 510 may use to identify documents related to a set of search terms. For example, when the set of search terms includes a single search term, information retrieval unit 510 might identify documents that contain the search term. When the set of search terms includes multiple search terms, information retrieval unit 510 might identify documents that contain the search terms as a phrase. Alternatively or additionally, information retrieval unit 510 might identify documents that contain the search terms, but not necessarily together. Alternatively or additionally, information retrieval unit 510 might identify documents that contain less than all of the search terms, or synonyms of the search terms. Yet other techniques for identifying relevant documents are known to those skilled in the art.

Presentation unit 520 may analyze the documents identified by information retrieval unit 510 as relevant to a set of search terms. For example, presentation unit 520 may identify the structural elements associated with the documents from the metadata associated with the documents in repository 530. Presentation unit 520 may also determine the hits associated with the documents. For example, presentation unit 520 may determine where the set of search terms occur within the content of the documents, possibly in relation to the structural elements of the documents.

In one implementation, presentation unit 520 may cluster the hits based on their physical proximity. Physical proximity may be determined based on clustering proximity thresholds. The thresholds may indicated how close (in terms of physical location) two hits have to be to be clustered. The thresholds may be fixed. Alternatively, the thresholds may be set proportional to the number of pages in the document, a part of the document, a sub-part of the document, etc. In this case, hits on pages that lie within the same part of a document may be clustered when the number of pages on which the hits occur are greater than some percentage of the total number of pages in the part, as indicated by the threshold. Further, clustering may be made to favor a cluster that lies within a single structural element over a cluster that lies within multiple structural elements. For each cluster, presentation unit 520 may determine the smallest structural element that encompasses the whole cluster and present this structural element as a search result.

Figure 6A:
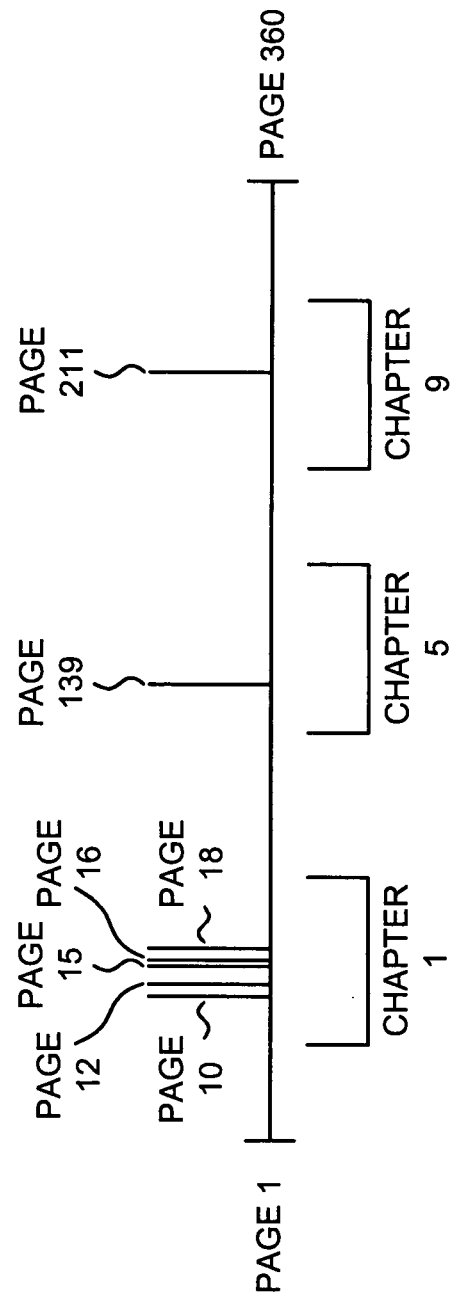
FIGS. 6A and 6B provide exemplary hit distributions within a document to illustrate how structural elements may be identified for inclusion in search results.

FIG. 6A shows exemplary hit distributions within a document to illustrate how structural elements may be identified for inclusion in search results. As shown in FIG. 6A, hits occur on pages 10, 12, 15, 16, 18, 139, and 211. As further shown in FIG. 6A, pages 10, 12, 15, 16, and 18 lie in chapter 1, page 139 lies in chapter 5, and page 211, lies in chapter 9. Based on the physical proximity of the pages containing hits, three clusters may be formed: {10, 12, 15, 16, 18}, {139}, and {211}. Assume that the thresholds are set such that the smallest structural element that encompasses the entire first cluster is chapter 1, the smallest structural element that encompasses the entire second cluster is page 139, and the smallest structural element that encompasses the entire third cluster is page 211. Accordingly, information concerning chapter 1, page 139, and page 211 may be provided as search results.

In another implementation, presentation unit 520 may identify a tree representation of the document's hierarchical structure, where leaf nodes may represent pages, higher level nodes may represent parts (e.g., chapters), and the root node may represent the whole document. Presentation unit 520 may identify the leaf nodes that contain hits as potential results. Presentation unit 520 may assign a score of 1 to each leaf node that contains a hit and a score of 0 to each leaf node that contains no hit. Alternatively, scores assigned to leaf nodes that contain hits may be something other than 1. For example, the scores may be a function of the importance of the hit. Importance may be determined based on the number of hits on a particular page and/or where a hit occurs on the page (e.g., hits on text in bold font, hits on text in larger sized font, and/or hits on text associated with headings may be scored higher).

The scores may then be propagated up the tree, where each node's score may include the sum of its children's scores. If a node's score exceeds a threshold, then that node may be selected as a potential result to be provided, any children nodes that were previously selected may be removed, and a score of 0 may be propagated to its parent. Otherwise, the node may propagate its full score up to its parent (if one exists). The thresholds may be fixed, level-specific, or a function of the number of pages associated with a node.

Figure 6B:
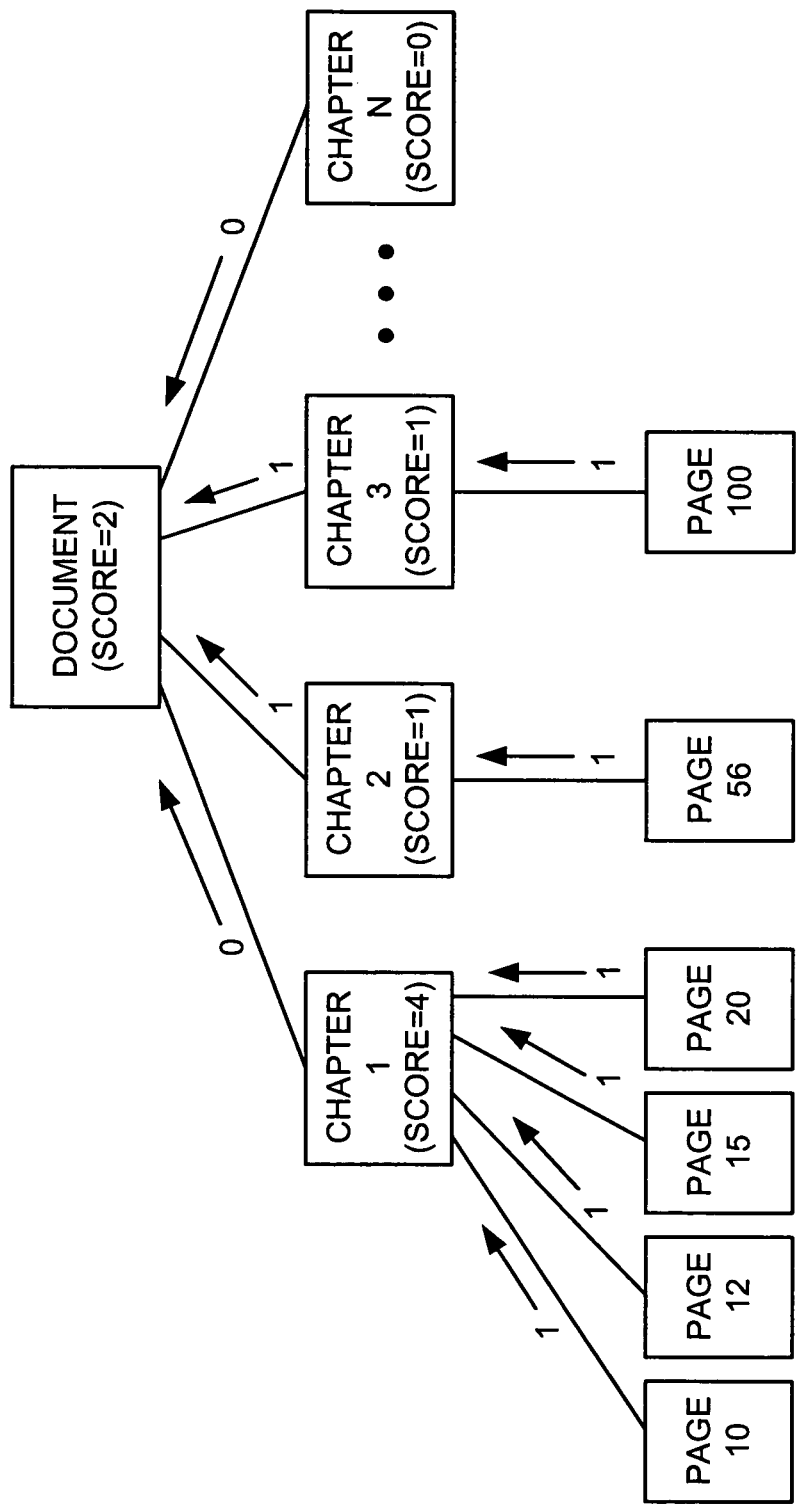

FIG. 6B shows exemplary hit distributions within a document to illustrate how structural elements may be identified for inclusion in search results. As shown in FIG. 6B, hits occur on pages 10, 12, 15, 20, 56, and 100. As further shown in FIG. 6B, pages 10, 12, 15, and 20 lie in chapter 1, page 56 lies in chapter 2, and page 100 lies in chapter 3. Each of the pages propagates its score up to its parent. The score for the parent (i.e., chapter) is the sum of the scores of its pages. In this case, chapter 1 has a score of 4, chapter 2 has a score of 1, chapter 3 has a score of 1, and chapter N has a score of 0.

Suppose that the threshold is set at 3. In this case, chapter 1's score exceeds the threshold and it is selected as a potential result. Pages 10, 12, 15, and 20 are, thereafter, no longer included as potential results. Because chapter 1 has been selected as a potential result, it propagates a score of 0 to its parent (i.e., the whole document). Chapters 2, 3, and N each has a score that is less than the threshold and, therefore, propagates its score to its parent. The score of the parent (i.e., the document) is the sum of the scores of its chapters. In this case, the document has a score of 2, which is less than the threshold. Accordingly, information concerning chapter 1, page 56, and page 100 may be provided as search results.

Exemplary Processing

FIGS. 7-9B are flowcharts of exemplary processing for presenting search results according to an implementation consistent with the principles of the invention. Processing may begin with a user providing search terms as a search query for searching a document corpus. In one implementation, the document corpus includes documents available from the Internet and the vehicle for searching this corpus is a search engine, such as search engine 325 (FIG. 3). The user may provide the search query via web browser software on a client, such as client 310 (FIG. 3).

The search query may be received by the search engine and used to identify documents (e.g., books, web sites, newspapers, articles, patents, or other types of structured documents) related to the search query (acts 710 and 720) (FIG. 7). A number of techniques exist for identifying documents related to a search query. One such technique might include identifying documents that contain the search terms as a phrase. Another technique might include identifying documents that contain the search terms, but not necessarily together. Other techniques might include identifying documents that contain less than all of the search terms, or synonyms of the search terms. Yet other techniques are known to those skilled in the art.

The hits (occurrences of the search terms within the document content) may be determined (act 730). For example, the document content may be searched to identify where the search terms occur within the document with regard to the structural elements of the document. For example, it may be determined in which parts, sub-parts, and/or pages the search terms occur.

Figure 8:
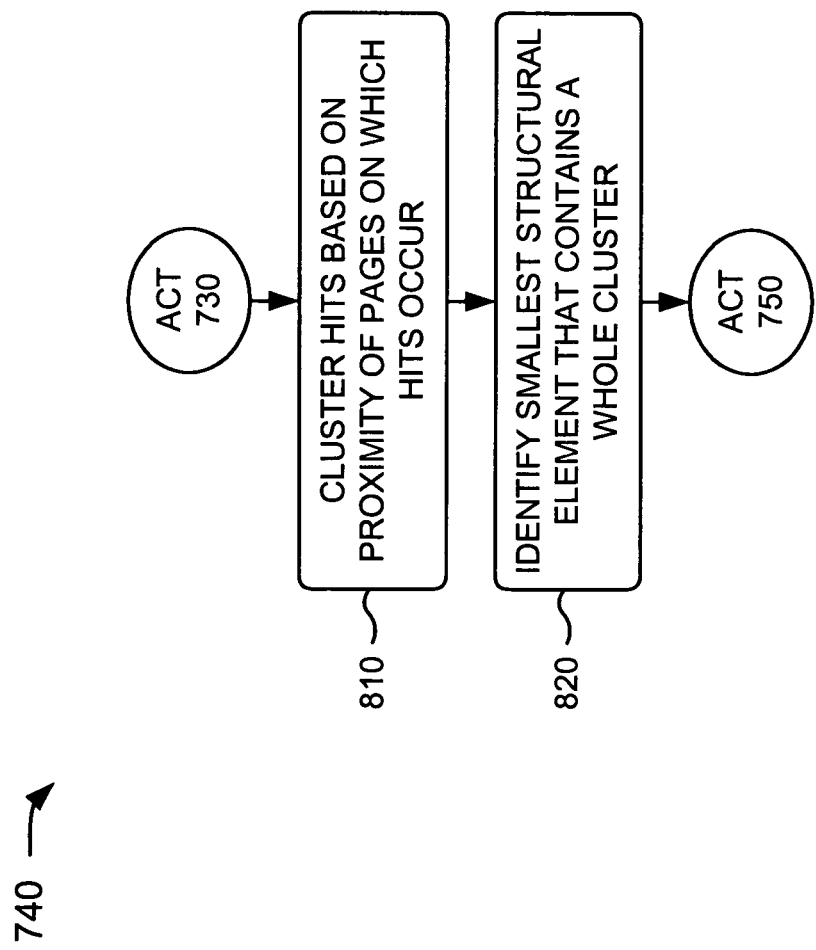

Structural element(s) to present may then be identified (act 740). According to one implementation, the hits may be clustered based on the proximity of the pages on which the hits occur (act 810) (FIG. 8). As explained above, proximity may be determined based on clustering proximity thresholds that specify, for example, how close two pages have to be to be clustered and/or whether to bias the clustering toward structural elements (e.g., whether to favor a cluster that lies within a single structural element over a cluster that lies within multiple structural elements). For each cluster, the smallest structural element that encompasses the whole cluster may be identified, whether this structural element is the entire document, a part, a sub-part, or a page.

According to another implementation, a tree representation of the document's hierarchical structure may be determined, where leaf nodes may represent pages, higher level nodes may represent parts, sub-parts, etc., and the root node may represent the whole document (act 905) (FIG. 9A). Leaf nodes that contain hits may be selected as potential results (act 910).

A score may then be assigned to each leaf node (act 915). In one implementation, leaf nodes that contain a hit may be assigned a score of 1 and leaf nodes that contain no hits may be assigned a score of 0. In another implementation, scores assigned to leaf nodes that contain hits may be a function of the importance of the hit, as described above.

Scores may then be propagated up the tree to the parent nodes (act 920). Scores may be determined for the parent nodes (act 925). In one implementation, the score of a parent node may include the sum of its children's scores. The scores of the parent nodes may be compared to a threshold. If the score of a parent node does not exceed the threshold (act 930), then it may be determined whether the parent node itself has a parent node (act 935). If such a parent node exists, then processing may return to act 920, where the node propagates its score up to its parent node.

If the score of a parent node exceeds the threshold (act 930), then the node may be selected as a potential result (act 940) (FIG. 9B). Any previously selected children nodes may then be removed from the group of potential results (act 945). It may then be determined whether the parent node itself has a parent node (act 950). If such a parent node exists, the node may propagate a score of 0 to its parent node (act 955). Processing may then return to act 925, where the score of the parent node(s) is determined. If no further parent nodes exist (act 935 or 950), then the structural elements corresponding to the nodes selected as potential results may be identified (act 960).

Search results may then be formed based on the identified structural element(s) for each of the documents (act 750) (FIG. 7). In other words, a search result associated with a document may, in some circumstances, include information associated with the entire document, a part of the document, a sub-part of the document, or a page in the document. The information associated with an entire document may include a title page (or front cover) of the document (even if none of the search terms appear on the title page). The information associated with a part or sub-part of a document may include a first page of the part or sub-part (even if none of the search terms appear on the first page of the part or sub-part). The information associated with a page in a document may include the page itself (or some portion of the page).

The search results may be scored and sorted based on their scores. The search results may be provided as a HTML document, similar to search results provided by conventional search engines. Alternatively, the search results may be provided according to a format agreed upon by the search engine and the client (e.g., Extensible Markup Language (XML)).

Figure 10A:
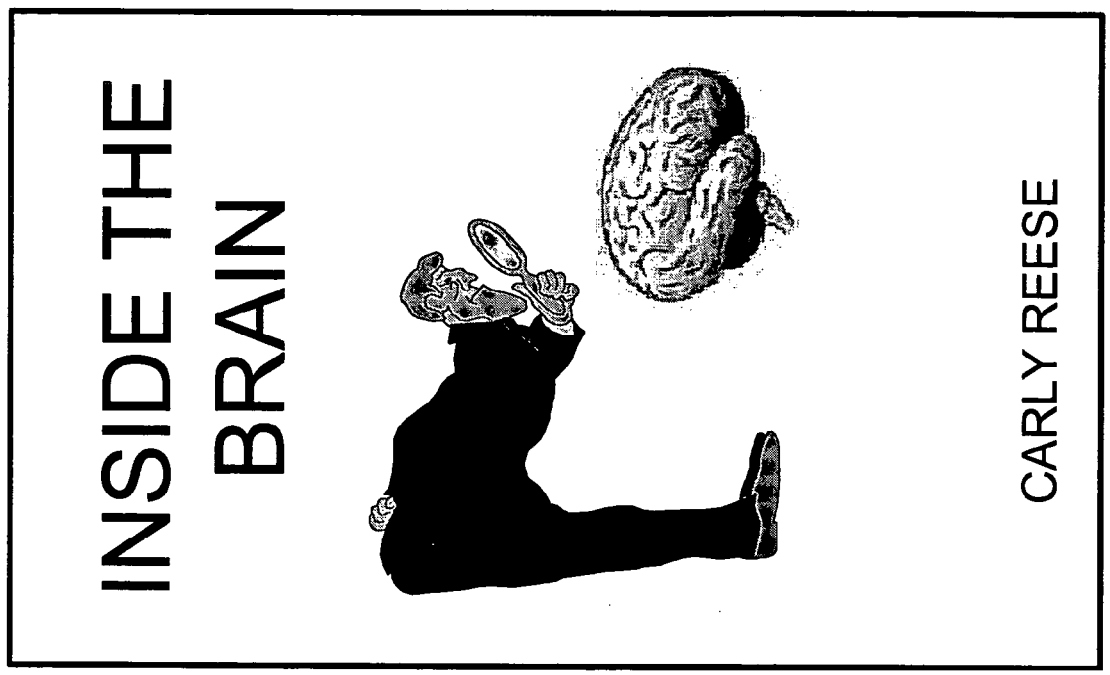
Figure 10B:
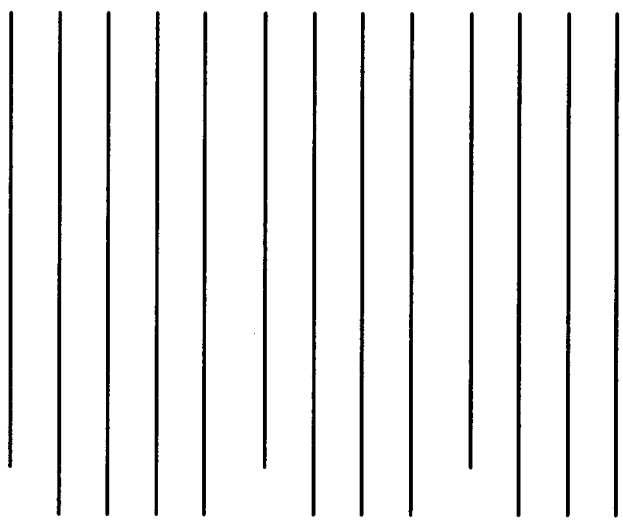
Figure 10D:
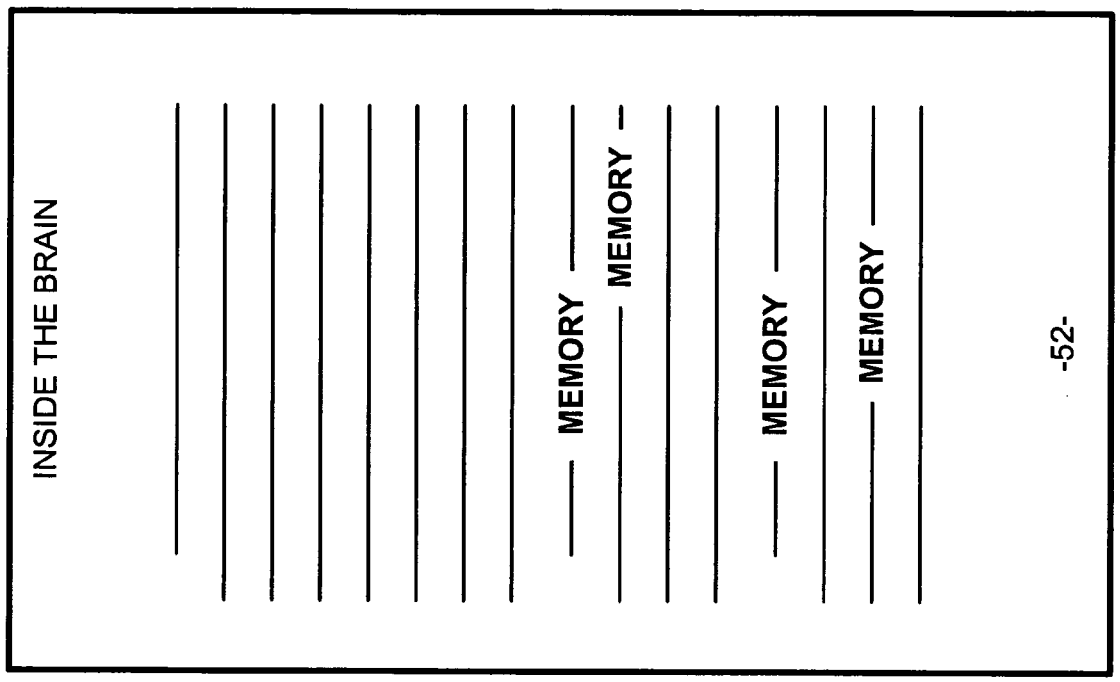

FIGS. 10A-10D illustrate exemplary search results for an exemplary book. FIG. 10A illustrates the front cover of the book. The front cover of the book may be presented to indicate that the entire book was determined to be relevant to a search query (e.g., "memory"). FIG. 10B illustrates the first page of chapter 3 of the book. The first page of the chapter may be presented to indicate that the entire chapter was determined to be relevant to the search query even though, as shown in FIG. 10B, the search term "memory" does not appear on the page. FIG. 10C illustrates the first page of chapter 4 of the book. In this case, the search term appears on the page. FIG. 10D illustrates page 52 of the book. Optionally, the search term may be highlighted in some manner to permit the user to easily identify the term within the text of the page.

CONCLUSION

Systems and methods consistent with the principles of the invention may generate search results based on the structural elements associated with the underlying documents and the distribution of hits within the documents.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 7-9B, the order of the acts may be modified in other implementations consistent with the principles of the invention. Further, non-dependent acts may be performed in parallel.

In one implementation, server 120 may perform most, if not all, of the acts described with regard to the processing of FIGS. 7-9B. In another implementation consistent with the principles of the invention, one or more, or all, of the acts may be performed by another entity, such as another server 330 and/or 340 or client 310.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   identifying, by a processor of the one or more server devices, a document relating to a search term,
      the document comprising structural elements;
   locating, by a processor of the one or more server devices, occurrences of the search term in the document;
   grouping, by a processor of the one or more server devices, the occurrences of the search term into at least one cluster,
      the grouping being based on relative locations of the occurrences of the search term, and
      the grouping favoring a cluster that lies within a particular structural element, of the structural elements, over a cluster that lies within multiple structural elements of the structural elements;
   identifying, by a processor of the one or more server devices, a structural element, of the structural elements, encompassing the at least one cluster; and
   providing, by a processor of the one or more server devices and for presentation, information associated with the identified structural element.

2. The method of claim 1, where, when identifying the document, the method includes:
   searching a corpus of documents to identify the document.

3. The method of claim 1, where the document comprises one of a book, a web site, a newspaper, an article, or a patent.

4. The method of claim 1, where, when locating the occurrences of the search term in the document, the method includes:
   searching a content of the document to identify occurrences of the search term with regard to the structural elements of the document.

5. The method of claim 4, where, when identifying the structural element, the method includes:
   determining, with respect to each of the structural elements, a smallest structural element, of the structural elements, encompassing each of the clusters.

6. The method of claim 1, where, when identifying the structural element, the method includes:
   determining, with respect to each of the structural elements, a smallest structural element, of the structural elements, encompassing each of the clusters.

7. The method of claim 6, where, when providing, for presentation, the information associated with the identified structural element, the method includes:
   generating a search result based on information associated with the smallest structural element.

8. The method of claim 1, further comprising:
   providing a threshold that specifies how close in physical proximity two occurrences of the search term have to be to be clustered,
   where, when grouping the occurrences of the search term into the at least one cluster, the method includes:
      grouping the occurrences of the search term into the at least one cluster based on the threshold.

9. The method of claim 8, where the threshold is proportional to a number of pages in the document.

10. The method of claim 1, where
    the document is a book, and
    the structural elements comprise at least one of:
       the book,
       a set of chapters of the book, or
       a set of pages of the book.

11. The method of claim 1, where
    the structural elements comprise the document, a set of parts of the document, and a set of pages of the document, and
    the information associated with the identified structural element is a title page of the document.

12. The method of claim 1, where
    the structural elements comprise the document, a set of parts of the document, and a set of pages of the document, and
    the information associated with the identified structural element is a first page of the document.

13. The method of claim 1, where
    the structural elements comprise the document, a set of parts of the document, and a set of pages of the document, and
    the information associated with the identified structural element is a page of the document.

14. The method of claim 1, where the information associated with the identified structural element includes a portion of the document that includes an occurrence of the search term.

15. The method of claim 1, where the information associated with the identified structural element includes a portion of the document that does not include an occurrence of the search term.

16. The method of claim 1, where, when providing, for presentation, the information associated with the identified structural element, the method includes:
    visually distinguishing the search term in the information associated with the identified structural element.

17. A computer-implemented system comprising:
    one or more devices to:
       obtain a document relating to a search term, the document comprising structural elements;
       identify occurrences of the search term in the document with regard to the structural elements;
       group occurrences of the search term into clusters based on a physical proximity of the occurrences of the search term,
          a first cluster, of the clusters, that lies within a particular structural element, of the structural elements, being favored over a second cluster, of the clusters, that lies within multiple structural elements of the structural elements;
       identify a structural element, of the structural elements, encompassing each of the clusters; and
       provide, for presentation, information relating to the identified structural element.

18. The computer-implemented system of claim 17, where the one or more devices are further to:
    search a corpus of documents to identify the document relating to the search term.

19. The computer-implemented system of claim 17, where the one or more devices are further to:
    determine a smallest structural element, of the structural elements, encompassing each of the clusters.

20. The computer-implemented system of claim 17, where the one or more devices, when identifying the structural element, are further to:
    determine, with respect to each of the structural elements, a smallest structural element, of the structural elements, encompassing each of the clusters, and
    the one or more devices, when providing, for presentation, the information relating to the identified structural element, are further to:

generate a search result based on information associated with the smallest structural element.

21. The computer-implemented system of claim 17, where the one or more devices are further to:
provide a threshold that specifies how close in physical proximity two occurrences of the search term have to be to be clustered, and
the one or more devices, when grouping the occurrences of the search term into clusters, are further to:
group the occurrences of the search term into clusters based on the threshold.

22. A device comprising:
a memory to store a corpus of documents,
at least one document, of the corpus of documents, comprising structural elements; and
a processor to:
receive a search query that includes a search term;
identify a document in the corpus of documents that is relevant to the search term, the at least one document including the document;
determine occurrences of the search term in the document based on the structural elements;
group the occurrences of the search term into clusters based on a physical proximity of the occurrences of the search term,
a first cluster, of the clusters, that lies within a particular structural element, of the structural elements, being favored over a second cluster, of the clusters, that lies within multiple structural elements of the structural elements;
identify a structural element, of the structural elements, encompassing each of the clusters; and
provide, for presentation, information associated with the identified structural element.

23. The device of claim 22, where the processor is further to:
search a content of the document to identify the occurrences of the search term with regard to the structural elements of the document.

24. The device of claim 23, where the processor is further to:
determine a smallest structural element, of the structural elements, encompassing each of the clusters.

25. The device of claim 22, where
the processor, when identifying the structural element, is further to:
determine, with respect to each of the structural elements, a smallest structural element, of the structural elements, encompassing each of the clusters, and
the processor, when providing, for presentation, the information relating to the identified structural element, is further to:
generate a search result based on information associated with the smallest structural element.

26. The device of claim 22, where
the processor is further to:
provide a threshold that specifies how close in physical proximity two occurrences of the search term have to be to be clustered, and
the processor, when grouping the occurrences of the search term into clusters, is further to:
group the occurrences of the search term into clusters based on the threshold.

27. The device of claim 22, where the processor, when providing, for presentation, the information associated with the identified structural element, is further to:
visually distinguish the search term in the information associated with the identified structural element.

28. A method performed by one or more server devices, the method comprising:
identifying, by a processor of the one or more server devices, a document that is relevant to a search term, the document comprising structural elements;
determining, by a processor of the one or more server devices, occurrences of the search term in the document;
grouping, by a processor of the one or more server devices, the occurrences of the search term into clusters based on physical proximity of the occurrences of the search term,
a first cluster, of the clusters, that lies within a particular structural element, of the structural elements, being favored over a second cluster, of the clusters, that lies within multiple structural elements of the structural elements;
determining, by a processor of the one or more server devices, a smallest structure element, of the structural elements, that encompasses each of the clusters; and
providing, by a processor of the one or more server devices, information related to the determined structural element.

29. The method of claim 28, further comprising:
providing a threshold that specifies how close in physical proximity two occurrences of the search term have to be to be clustered,
where, when grouping the occurrences of the search term into clusters, the method includes:
grouping the occurrences of the search term into clusters based on the threshold.

30. The method of claim 29, where the threshold is proportional to a number of pages in the document.

31. A computer-implemented system comprising:
one or more devices to:
identify a document that is relevant to a search term, the document comprising structural elements;
identify occurrences of the search term in the document;
group the occurrences of the search term into clusters based on a threshold that specifies how close in physical proximity two occurrences of the search term have to be to be clustered,
the threshold being proportional to a number of pages in the document;
determine a structural element, of the structural elements, encompassing each of the clusters; and
provide, for presentation, information related to the structural element.

32. The computer-implemented system of claim 31, where
the document is a book, and
the structural elements include the book, a set of chapters of the book, and a set of pages of the book.

33. A method performed by one or more server devices, the method comprising:
identifying, by a processor of the one or more server devices, a document that is relevant to a search term, the document comprising structural elements,
where the structural elements comprise the document, a set of parts of the document, and a set of pages of the document;
identifying, by a processor of the one or more server devices, a tree representation of the document,
where the pages of the document correspond to leaf nodes, the parts of the document correspond to higher level nodes, and the document corresponds to a root node;

assigning, by a processor of the one or more server devices, scores to the leaf nodes based on whether the leaf nodes contain occurrences of the search term;

determining, by a processor of the one or more server devices, scores for the higher level nodes based on the scores of associated ones of the leaf nodes;

determining, by a processor of the one or more server devices, a score for the root node based on the scores of the higher level nodes;

providing, by a processor of the one or more server devices, a threshold,
  where the threshold is based on at least one of:
    a number of pages associated with one of the leaf nodes,
    a number of pages associated with one of the higher level nodes, or
    a number of pages associated with the root node;

selecting, by a processor of the one or more server devices, one of the leaf nodes, one of the higher level nodes, or the root node, as a selected node, based on the scores and the threshold; and providing, by a processor of the one or more server devices, information relating to the selected node.

34. The method of claim 33, where, when selecting one of the leaf nodes, one of the higher level nodes, or the root node, the method includes at least one of:
  selecting one of the leaf nodes that contains an occurrence of the search term as a potential result;
  selecting one of the higher level nodes as a potential result when the score of the one higher level node is greater than the threshold; or
  selecting the root node as a potential result when the score of the root node is greater than the threshold.

35. The method of claim 34, where, when selecting the one of the leaf nodes, one of the higher level nodes, or the root node, the method includes:
  removing a selection of a leaf node associated with a higher level node when the higher level node is selected as a potential result; and
  removing a selection of the leaf nodes and the higher level nodes when the root node is selected as a potential result.

36. The method of claim 33, where, when assigning scores to the leaf nodes, the method includes:
  assigning a score of 0 to a leaf node that contains no occurrence of the search term; and
  assigning a score of 1 to a leaf node that contains an occurrence of the search term.

37. The method of claim 33, where, when assigning scores to the leaf nodes, the method includes:
  assigning a score of 0 to a leaf node that contains no occurrence of the search term; and
  assigning, to a leaf node that contains an occurrence of the search term, a score that is a function of an importance of the occurrence of the search term.

38. The method of claim 33, where the information related to the selected node is a title page of the document when the document is the selected node.

39. The method of claim 33, where the information related to the selected node is a first page of the part when the part is the selected node.

40. The method of claim 33, where the information related to the selected node is the page of the document when the page is the selected node.

41. A computer-implemented system comprising:
  one or more devices to:
    identify a document that is relevant to a search term;
    identify a tree representation of the document, where pages of the document correspond to leaf nodes, parts of the document correspond to higher level nodes, and the document corresponds to a root node;
    assign scores to the leaf nodes based on whether the leaf nodes contain occurrences of the search term;
    determine scores for the higher level nodes based on the scores of associated ones of the leaf nodes;
    determine a score for the root node based on the scores of the higher level nodes;
    provide a threshold,
      where the threshold is threshold is based on at least one of:
        a number of pages associated with one of the leaf nodes,
        a number of pages associated with one of the higher level nodes, or
        a number of pages associated with the root node;
    select one of the leaf nodes, one of the higher level nodes, or the root node, as a selected node, based on the scores and the threshold; and
    provide information relating to the selected node.

42. The computer-implemented system of claim 41, where the one or more devices are further to:
  assign a score of 0 to a leaf node that contains no occurrences of the search term; and
  assign a score of 1 to a leaf node that contains an occurrence of the search term.

43. The computer-implemented system of claim 41, where the one or more devices are further to:
  assign a score of 0 to a leaf node that contains no occurrence of the search term; and
  assign, to a leaf node that contains an occurrence of the search term, a score that is a function of an importance of the occurrence of the search term.

44. A non-transitory computer-readable storage medium containing computer-executable instructions, the instructions comprising:
  one or more instruction which, when executed by a processor of a device, cause the processor to:
    determine that a document is relevant to a search term, the document comprising structural elements;
    determine occurrences of the search term in the document;
    group the occurrences of the search term into clusters based on physical proximity of the occurrences of the search term,
      a first cluster, of the clusters, that lies within a particular structural element, of the structural elements, being favored over a second cluster, of the clusters, that lies within multiple structural elements of the structural elements;
    determine a structural element, of the structural elements, encompassing each of the clusters; and
    provide, for presentation, information relating to the determined structural element.

45. The non-transitory computer-readable storage medium of claim 44, where
  the structural elements comprise the document, a set of parts of the document, and a set of pages of the document; and
  the information related to the one of the identified structural elements is a title page of the document when the document is the one of the identified structural elements.

46. The non-transitory computer-readable storage medium of claim 44, where the information relating to at least one of the determined structural elements includes a portion of the document that includes an occurrence of the search term.

* * * * *